(12) United States Patent
Chen

(10) Patent No.: US 7,699,330 B2
(45) Date of Patent: Apr. 20, 2010

(54) FOUR-BAR LINKAGE SUSPENSION DEVICE FOR A WHEELED VEHICLE

(76) Inventor: Hsueh-Yi Chen, No. 20, Alley 2, Lane 201, Chung-Hsiao St., Hsin-Shih Hsiang, Tainan Hsien (TW)

( * ) Notice: Subject to any disclaimer, the term of this patent is extended or adjusted under 35 U.S.C. 154(b) by 127 days.

(21) Appl. No.: 12/038,865

(22) Filed: Feb. 28, 2008

(65) Prior Publication Data

US 2009/0218778 A1 Sep. 3, 2009

(51) Int. Cl.
*B62K 25/04* (2006.01)
*B62K 25/24* (2006.01)

(52) U.S. Cl. ..................................... 280/276
(58) Field of Classification Search .............. 280/276, 280/277, 275, 286, 283, 124.13; 180/219
See application file for complete search history.

(56) References Cited

U.S. PATENT DOCUMENTS

| | | | | |
|---|---|---|---|---|
| 913,961 A * | 3/1909 | Levedahl | ..................... | 280/276 |
| 940,245 A * | 11/1909 | Gates | ..................... | 280/276 |
| 946,143 A * | 1/1910 | Levedahl | ..................... | 280/276 |
| 1,042,480 A * | 10/1912 | Ridgway | ..................... | 280/276 |
| 1,096,417 A * | 5/1914 | Ekstrom | ..................... | 280/277 |
| 1,223,572 A * | 4/1917 | Drew | ..................... | 280/276 |
| 1,251,992 A * | 1/1918 | Drew | ..................... | 280/276 |
| 5,441,291 A * | 8/1995 | Girvin, III | ..................... | 280/276 |
| 5,743,547 A * | 4/1998 | Voss et al. | ..................... | 280/277 |
| 5,749,590 A * | 5/1998 | Roerig | ..................... | 280/276 |
| 6,517,095 B1 * | 2/2003 | Lansac et al. | ..................... | 280/276 |
| 2002/0084619 A1 * | 7/2002 | Odom | ..................... | 280/276 |
| 2004/0036250 A1 * | 2/2004 | Kofuji | ..................... | 280/276 |

FOREIGN PATENT DOCUMENTS

JP 01204888 A * 8/1989

* cited by examiner

*Primary Examiner*—Lesley Morris
*Assistant Examiner*—Wesley Potter
(74) *Attorney, Agent, or Firm*—Choate, Hall & Stewart, LLP

(57) ABSTRACT

A shock-absorbing suspension device includes a mounting rod mounted on a wheeled vehicle frame, a wheel rod mounted on a vehicle wheel axle and forward of the mounting rod, a counteracting member pivotally mounted on the mounting rod and having upper and lower linked ends disposed forward of the wheel rod, upper and lower linking bars coupling the upper and lower linked end to the wheel rod to thereby form a four-bar linkage mechanism, a cantilever arm extending forward from an upper end of the mounting rod to terminate at a bearing end, and a force transmitting member coupled with the four-bar linkage mechanism to thereby minimize the impact of shock to the mounting rod.

11 Claims, 9 Drawing Sheets

FOUR-BAR LINKAGE SUSPENSION DEVICE FOR A WHEELED VEHICLE

BACKGROUND OF THE INVENTION

1. Field of the Invention

This invention relates to a shock-absorbing suspension device for a wheeled vehicle, more particularly to a shock-absorbing suspension device for coupling a frame of the wheeled vehicle with a wheel axle.

2. Description of the Related Art

A conventional shock-absorbing suspension device disclosed in U.S. Pat. No. 913,961 includes upper and lower vertically swinging links which are loosely connected between a front fork and a steering head of a bicycle frame, and a spring cushioning member which is disposed between a crossbar of the front fork and the steering head so as to absorb or cushion shocks and jars transmitted to the bicycle frame due to passing of the bicycle over rough and uneven roadways.

However, since the moving stroke of the swinging links is short, a large amount of shock is still transmitted to the bicycle frame, thereby reducing the shock absorbing of the device.

SUMMARY OF THE INVENTION

An object of the present invention is to provide a shock-absorbing suspension device with a counteracting member which is movable upwards and downwards so as to effectively dampen shocks transmitted to a frame of a wheeled vehicle.

According to an embodiment of this invention, the shock-absorbing suspension device includes a mounting rod, a wheel rod, a counteracting member, upper and lower linking bars, a cantilever arm, and a force transmitting member.

The mounting rod is adapted to be mounted on a frame of a wheeled vehicle, and has upper and lower ends opposite to each other in an upright direction. The wheel rod has a lower segment which is adapted to be mounted on a wheel axle of the vehicle to transmit upwards from the wheel axle a shock force generated as a result of passing of the wheeled vehicle over an uneven road surface, and an upper segment which extends from the lower segment in the upright direction to terminate at a top end that is jerked upwards and downwards when the shock force is transmitted upwards. The upper segment has proximate and distal regions relative to the top end, and is disposed forward of the mounting rod in a longitudinal direction transverse to the upright direction.

The counteracting member includes a pivoted region which is pivotally mounted on the lower end of the mounting rod about a pivoting axis in a transverse direction transverse to both the upright and longitudinal directions, and a counteracting body which extends from the pivoted region forward to terminate at a coupler area that extends in the upright direction to terminate at upper and lower linked ends.

The upper linking bar is disposed to couple the upper linked end to the proximate region, and the lower linking bar is disposed to couple the lower linked end to the distal region to thereby form a four-bar linkage mechanism, such that upward or downward jerking movement of the top end results in upward and downward movement of the coupler area of the counteracting body about the pivoting axis, thereby dampening the shock force transmitted to the counteracting body. The cantilever arm is disposed to extend from the upper end in the longitudinal direction to terminate at a bearing end. The force transmitting member is disposed to couple with the four-bar linkage mechanism so as to transmit the dampened shock force to the bearing end to thereby minimize the impact of the shock force on the mounting rod.

In some embodiments, a connecting rod is configured to couple the upper segment to one of the force transmitting member and the cantilever arm so as to generate an auxiliary counteracting force to urge the force transmitting member against the upward or downward jerking movement.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION

Figure 1:
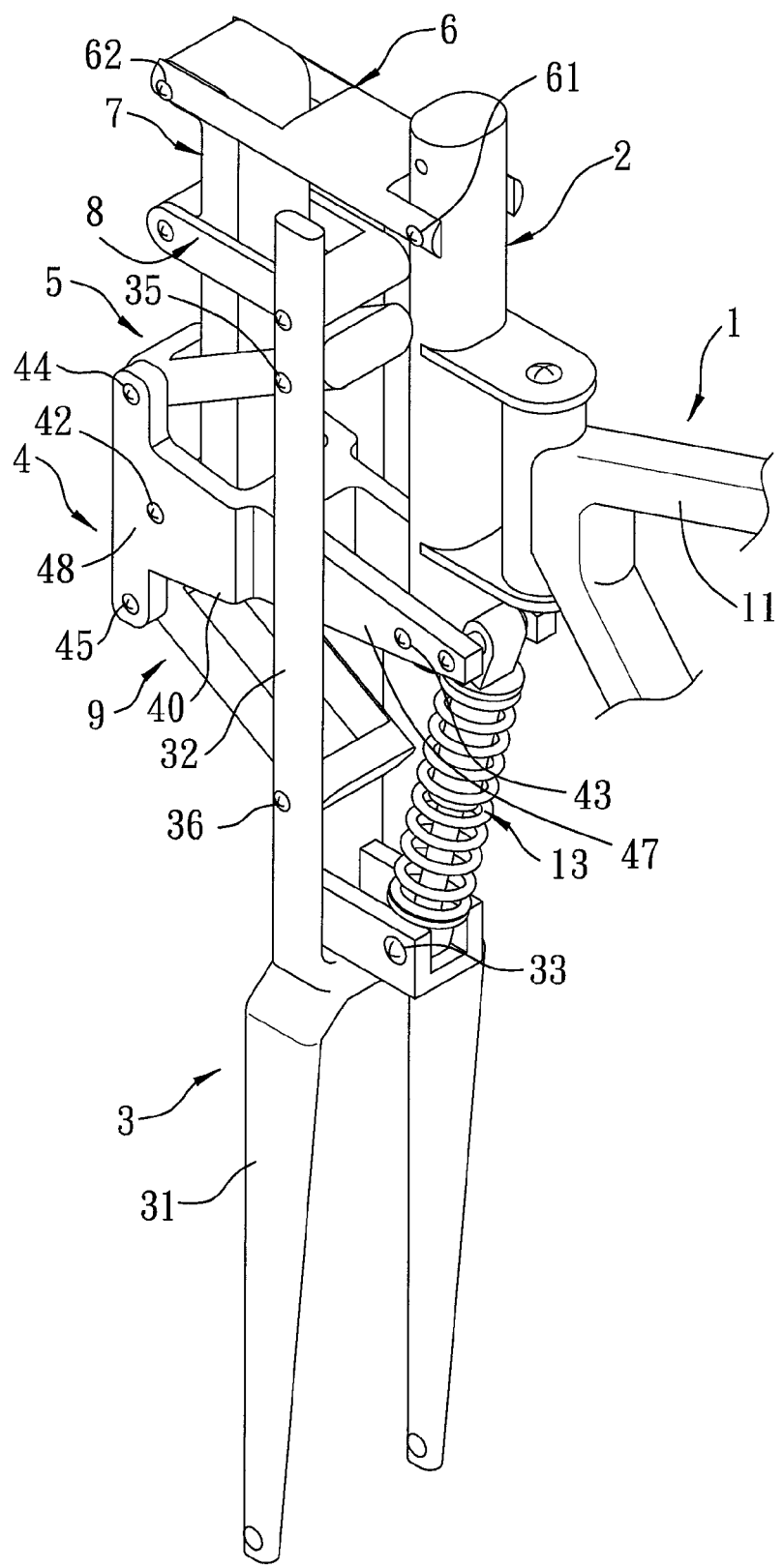
FIG. 1 is a perspective view of a first embodiment of a shock-absorbing suspension device according to this invention.

Before the present invention is described in greater detail, it should be noted that same reference numerals have been used to denote like elements throughout the specification.

Figure 2:
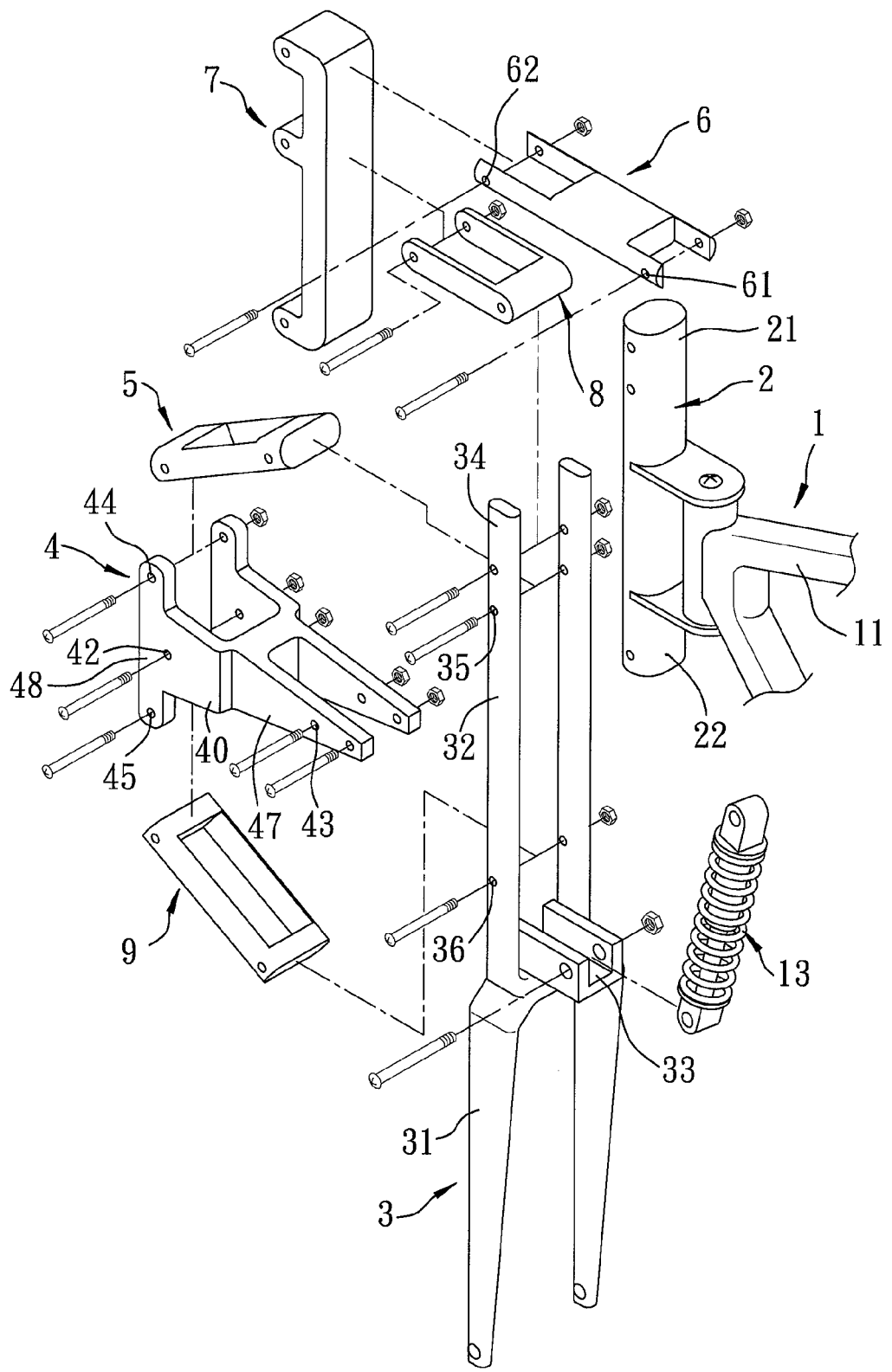
FIG. 2 is an exploded perspective view of the first embodiment.
Figure 3:
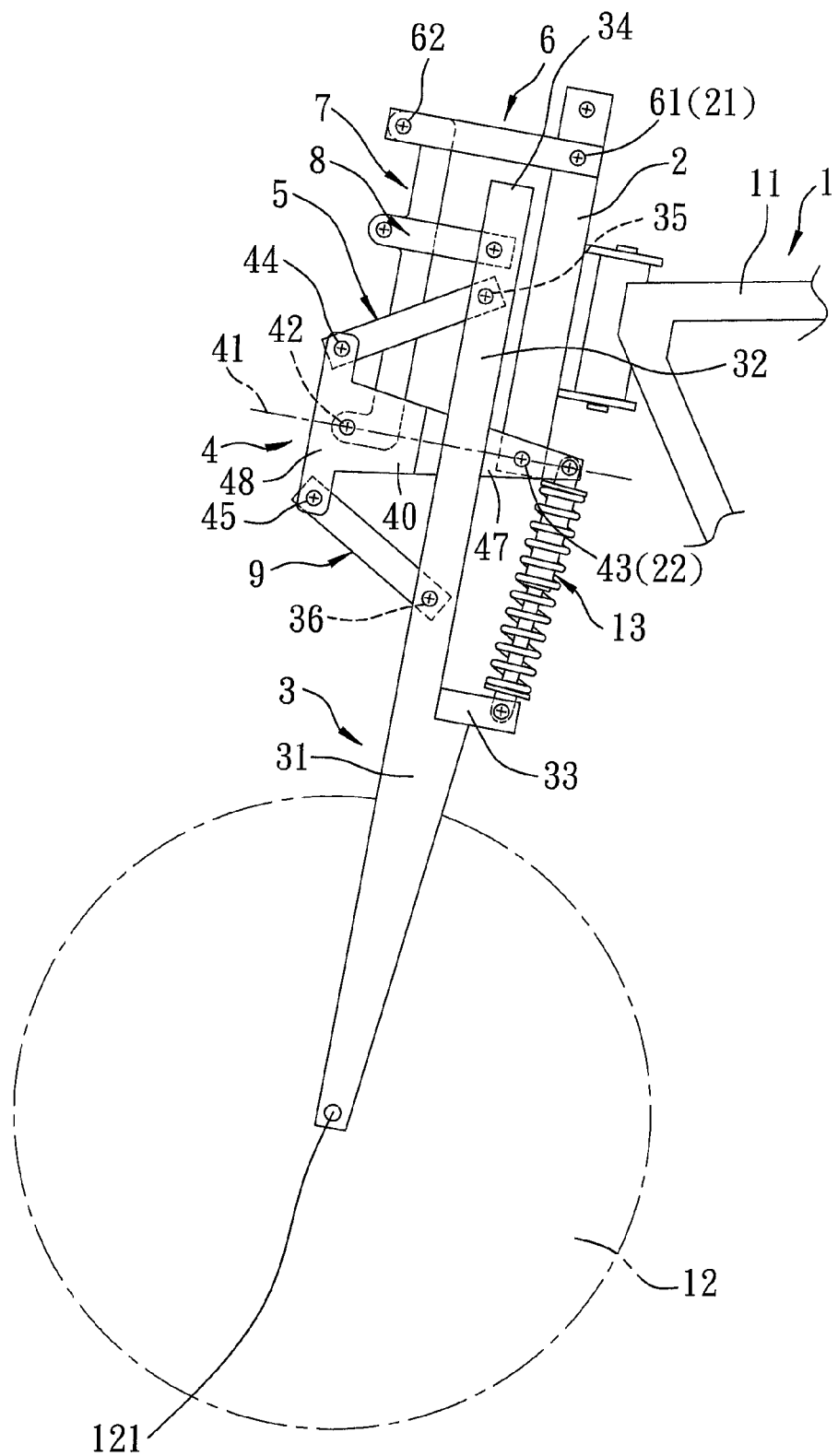
FIG. 3 is a schematic side view of the first embodiment.

Referring to FIGS. 1 to 3, a first embodiment of a shock-absorbing suspension device according to the present invention is shown to comprise a mounting rod 2, a wheel rod 3, a counteracting member 4, upper and lower linking bars 5, 9, a cantilever arm 6, a force transmitting member 7, a connecting rod 8, and a spring-loaded shock-absorber 13.

The mounting rod 2, such as a steering rod, includes upper and lower ends 21, 22 opposite to each other in an upright direction, and is adapted to be rotatably mounted on a frame 11 of a wheeled vehicle 1, such as a motorcycle or a bicycle.

The wheel rod 3 has a fork-type lower segment 31 which is adapted to be mounted on a wheel axle 121 of a front wheel 12 of the wheeled vehicle 1 to transmit upwards from the wheel axle 121 a force of shock generated as a result of passing of the wheeled vehicle 1 over an uneven road surface, and an upper segment 32 which extends from the lower segment 31 in the upright direction to terminate at a top end 34 that is jerked upwards and downwards when the shock force is transmitted upwards. The upper segment 32 has proximate and distal regions 35, 36 relative to the top end 34, and is disposed forward of the mounting rod 2 in a longitudinal direction transverse to the upright direction.

The counteracting member 4 includes a pivoted region 47 which is pivotally mounted on the lower end 22 of the mounting rod 2 about a pivoting axis 43 in a transverse direction transverse to both the upright and longitudinal directions, and a counteracting body 40 which extends forward from the pivoted region 47 to terminate at a coupler area 48 that extends in the upright direction to terminate at upper and lower linked ends 44, 45.

The upper linking bar 5 is disposed to couple the upper linked end 44 of the counteracting member 4 to the proximate region 35 of the wheel rod 3, and the lower linking bar 9 is disposed to couple the lower linked end 45 of the counteracting member 4 to the distal region 36 of the wheel rod 3 such that the coupler area 48, the upper and lower linking bars 5, 9 and the upper segment 32 form a four-bar linkage mechanism. Thus, as a result of upward or downward jerking movement of the top end 34 of the wheel rod 3 when the wheel 12 is passing over an uneven road surface, the coupler area 48 of the counteracting body 4 is moved downwards or upwards about the pivoting axis 43, thereby dampening the shock force transmitted to the counteracting body 40.

The cantilever arm 6 has a rear bearing end 61 which is pivotally connected to the upper end 21 of the mounting rod 2, and extends in the longitudinal direction to terminate at a front bearing end 62.

The force transmitting member 7 is configured to couple the counteracting body 40 to the front bearing end 62 of the cantilever arm 6 so as to impart the dampened shock force to the upper end 21 of the mounting rod 2, thereby minimizing the impact of the shock force on the mounting rod 2.

The connecting rod 8 is configured to couple the upper segment 32 of the wheel rod 3 to the force transmitting member 7 so as to generate an auxiliary counteracting force to urge the force transmitting member 7 against the upward or downward jerking movement of the top end 34.

The spring-loaded shock-absorber 13 is a mechanism disposed to couple a mounting rack 33 of the wheel rod 3 to the pivoted region 47 of the counteracting member 4 at a position that is rearward of the pivoting axis 43. It is noted that the number and position of the spring-loaded shock-absorber 13 described above are for purposes of illustration only and are not intended to limit the scope of this invention.

Specifically, the upper and lower linking bars 5, 9 respectively define upper and lower lengthwise lines which extend forward and intersect at a vertex 49. The force transmitting member 7 is coupled to the counteracting body 40 at a pivotal point 42 such that a pivotal axis passing through the pivotal point 42 is oriented in a direction parallel to the pivoting axis 43, and such that the pivotal axis intersects a straight line 41 drawn between the vertex 49 and the pivotal axis substantially at a right angle. Moreover, in terms of the four-bar linkage mechanism, a frame-side length measured along the upper segment 32 is two times a coupler-side length measured along the coupler area 48.

In this embodiment, the connecting rod 8 is disposed to extend parallel to the straight line 41. The connecting rod 8 has a length which is the same as a distance between the pivotal point 42 and the upper segment 32 along the straight line 41.

In this embodiment, the connecting rod 8 is disposed between the cantilever arm 6 and the upper linking bar 5 in the upright direction.

Figure 4:
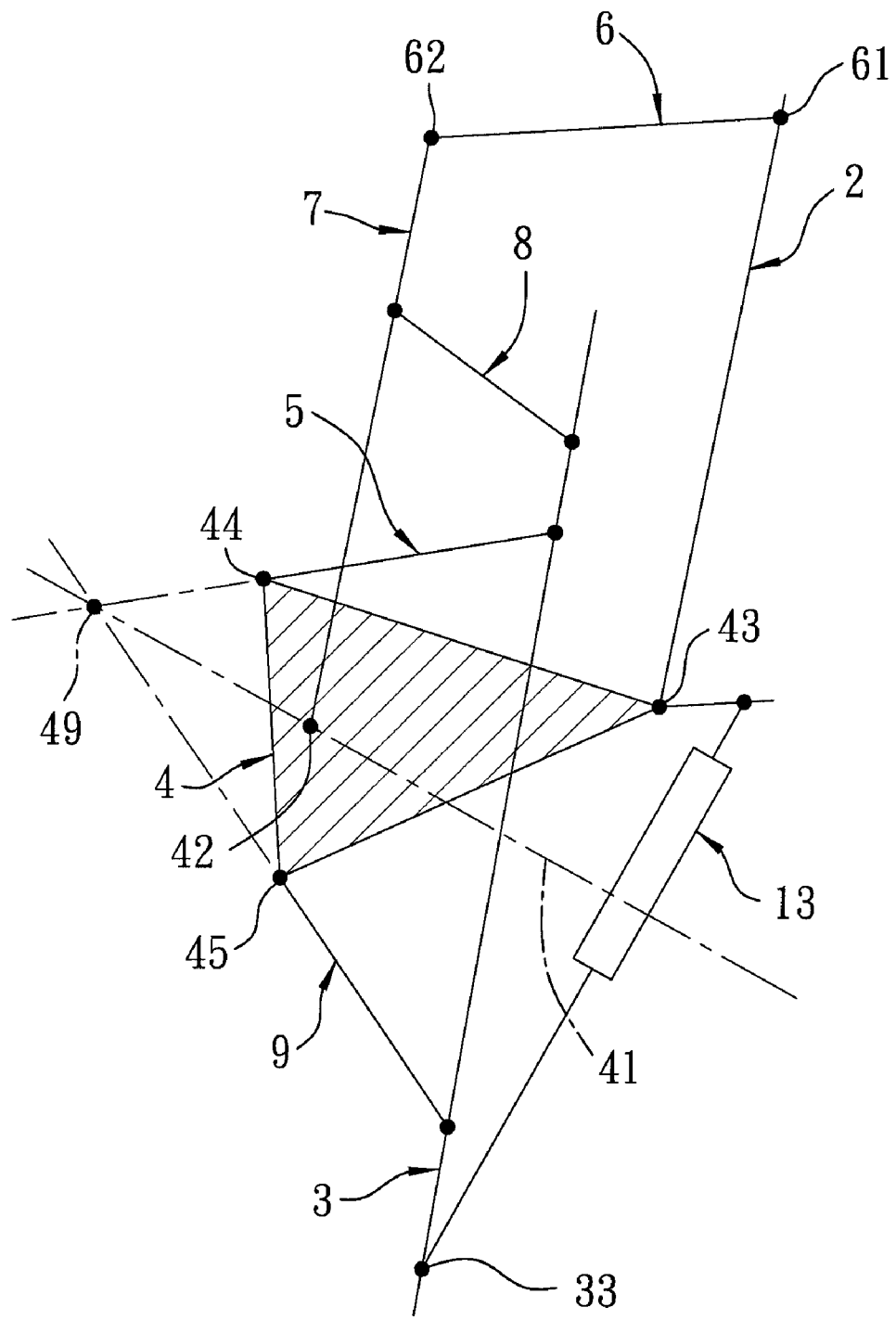
FIG. 4 is a schematic diagram of the first embodiment in a non-use state.
Figure 5:
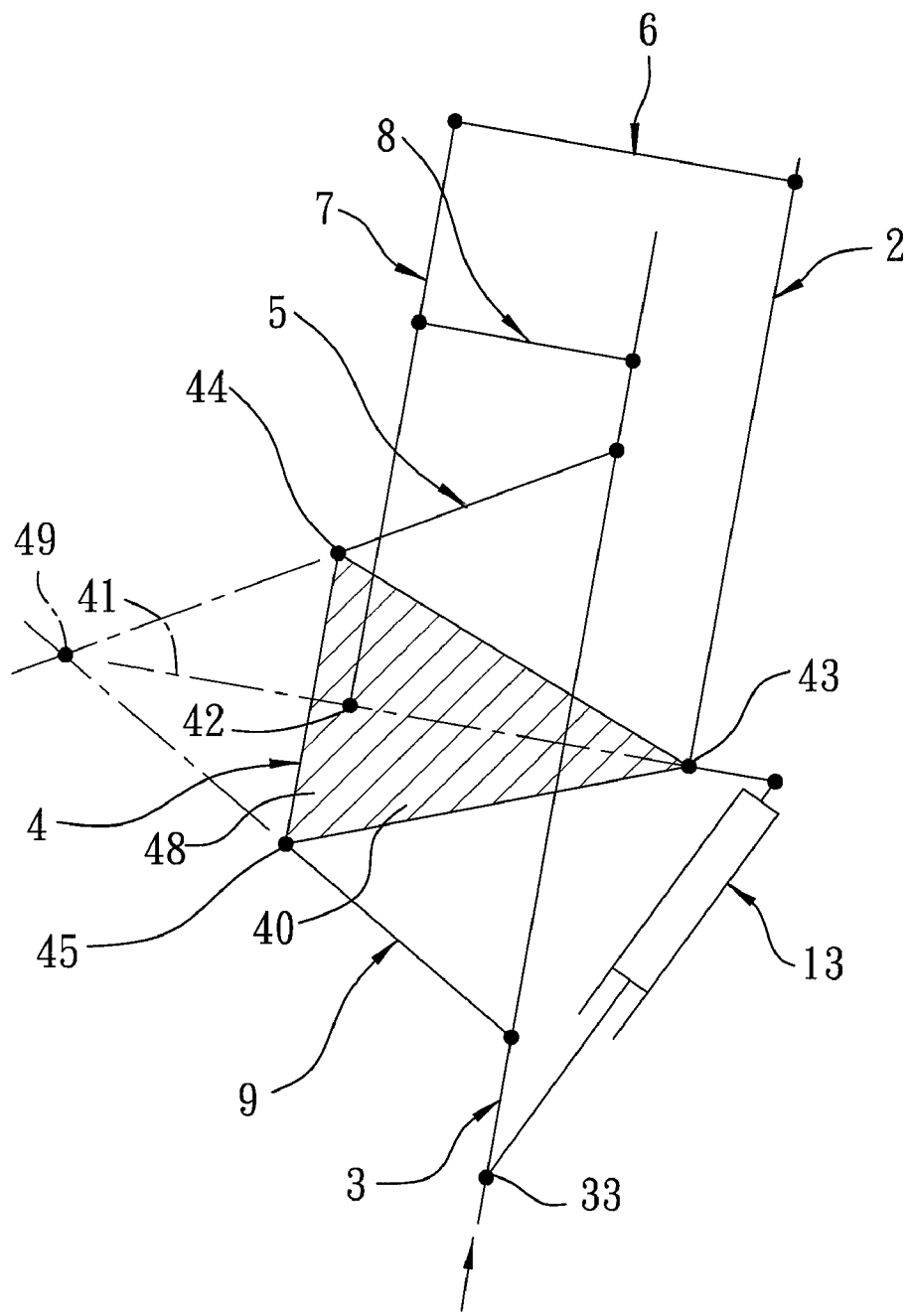
FIG. 5 is a schematic diagram of the first embodiment in a state of use.
Figure 6:
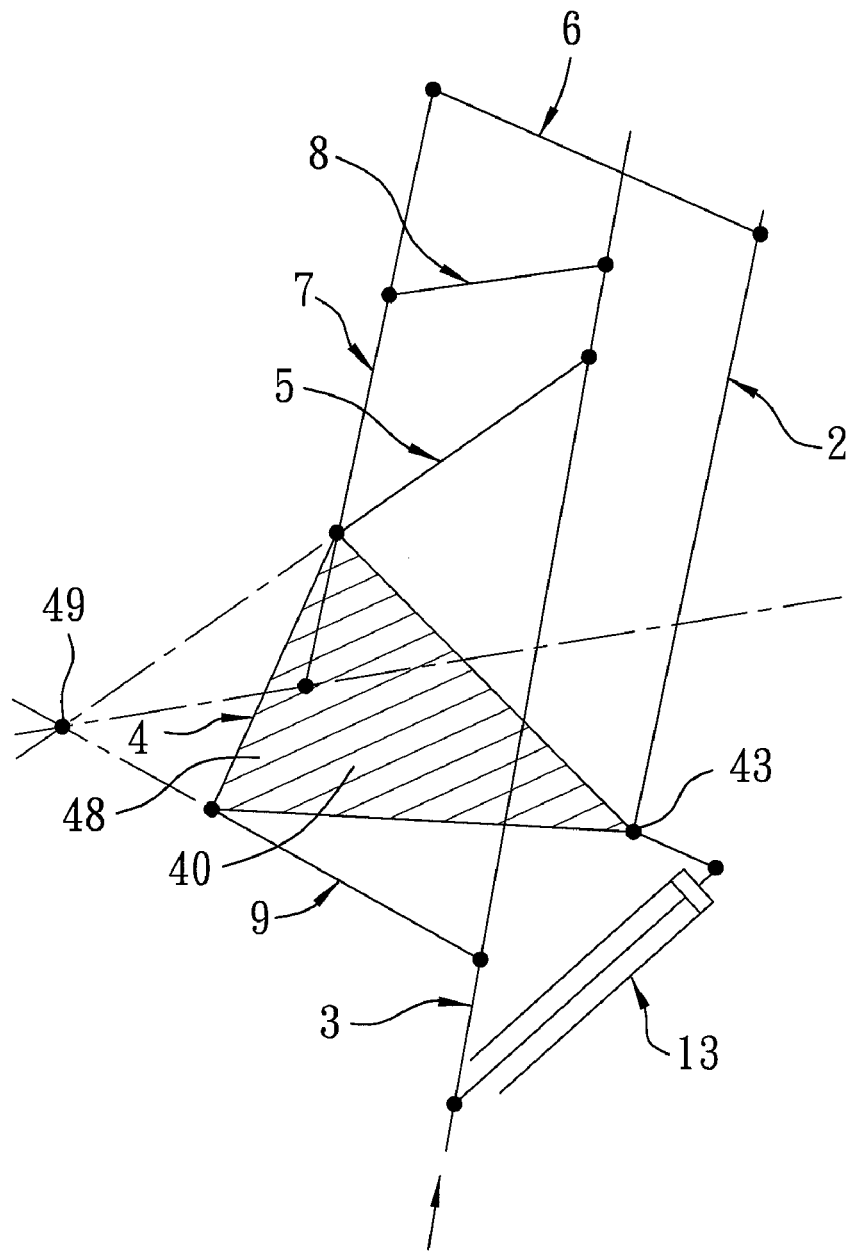
FIG. 6 is a schematic diagram of the first embodiment in a state where a wheel is passing over a bumpy roadway.

FIG. 4 shows the suspension device in a non-use state where the spring-loaded shock-absorber 13 is not compressed. FIG. 5 shows the suspension device in a state of use where the rider is seated on the bicycle frame 11. When the front wheel 12 moves over a bumpy road surface, as shown in FIG. 6, the coupler area 48 of the counteracting body 40 is swung about the pivoting axis 43 through the upper and lower linking bars 5, 9 and the connecting rod 8, thereby dampening the shock force transmitted to the counteracting body 40. The shock force is further dampened through the force transmitting member 7 and the cantilever arm 6. Moreover, through compression of the spring-loaded shock-absorber 13, the impact of the shock force on the mounting rod 2 can be minimized. The suspension device of this invention can be returned to the state shown in FIG. 5 by virtue of the restoring force of the spring-loaded shock-absorber 13.

As illustrated, with an embodiment of the shock-absorbing suspension device of this invention, the shock force generated as a result of upward or downward jerking movement of the wheel rod 3 can be transmitted to the upper and lower linking bars 5, 9 and the connecting rod 8 to swing the counteracting body 40 about the pivoting axis 43 so that the shock force is dampened. The dampened shock force is then transmitted to the force transmitting member 7 and the cantilever arm 6 so that the shock force is further dampened and imparted to the mounting rod 2. Thus, the shock force can be effectively dampened before being transmitted to the frame 11 of the wheeled vehicle 1.

The connecting rod 8 described above and shown in the first embodiment is illustrated to be disposed between the cantilever arm 6 and the upper linking bar 5. However, many variations in the positional relationship among the connecting rod 8, the upper linking bar 5 and the cantilever arm 6 can be made. For example, the connecting rod 8 may be disposed parallel to and at the same height as the cantilever arm 6. The cantilever arm 6 and the connecting rod 8 may be located at a slightly lower height relative to the upper linking bar 5. The connecting rod 8 and the upper linking bar 5 may be coaxially pivoted to the upper segment 32.

Figure 7:
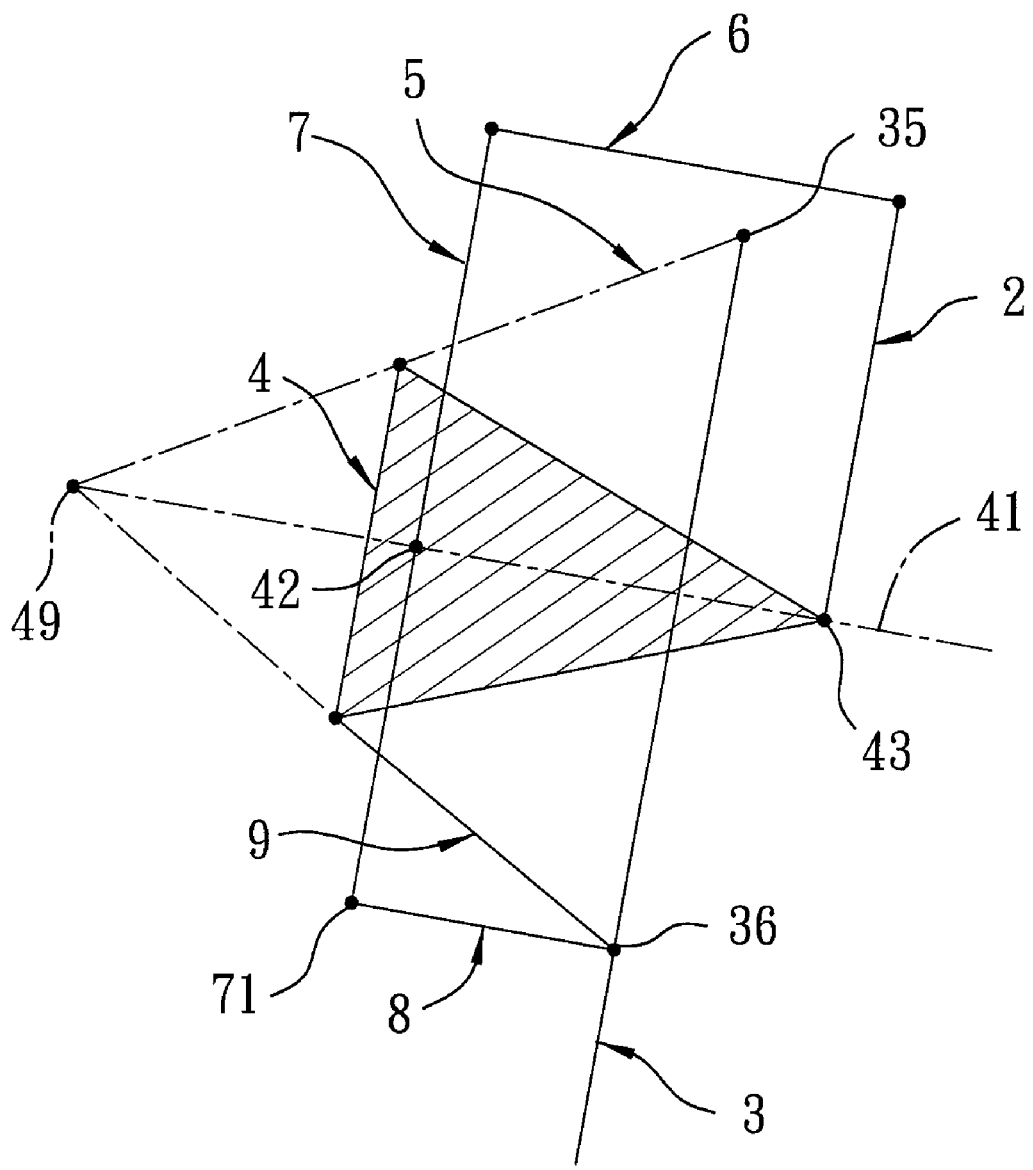
FIG. 7 is a schematic diagram of a second embodiment of a shock-absorbing suspension device according to this invention in a state of use.

Referring to FIG. 7, a second embodiment of a shock-absorbing suspension device according to this invention is shown to be similar to the first embodiment in construction, except that the force transmitting member 7 in this embodiment is configured to extend downwardly from the pivotal point 42 to terminate at a lower coupled end 71, and the connecting rod 7 is disposed to couple the distal region 36 to the lower coupled end 71. In this embodiment, the connecting rod 7 and the lower linking bar 9 are coaxially pivoted to the distal region 36. It is noted that the connecting rod 8 may be disposed upwardly or downwardly of the lower linking bar 9.

Figure 8:
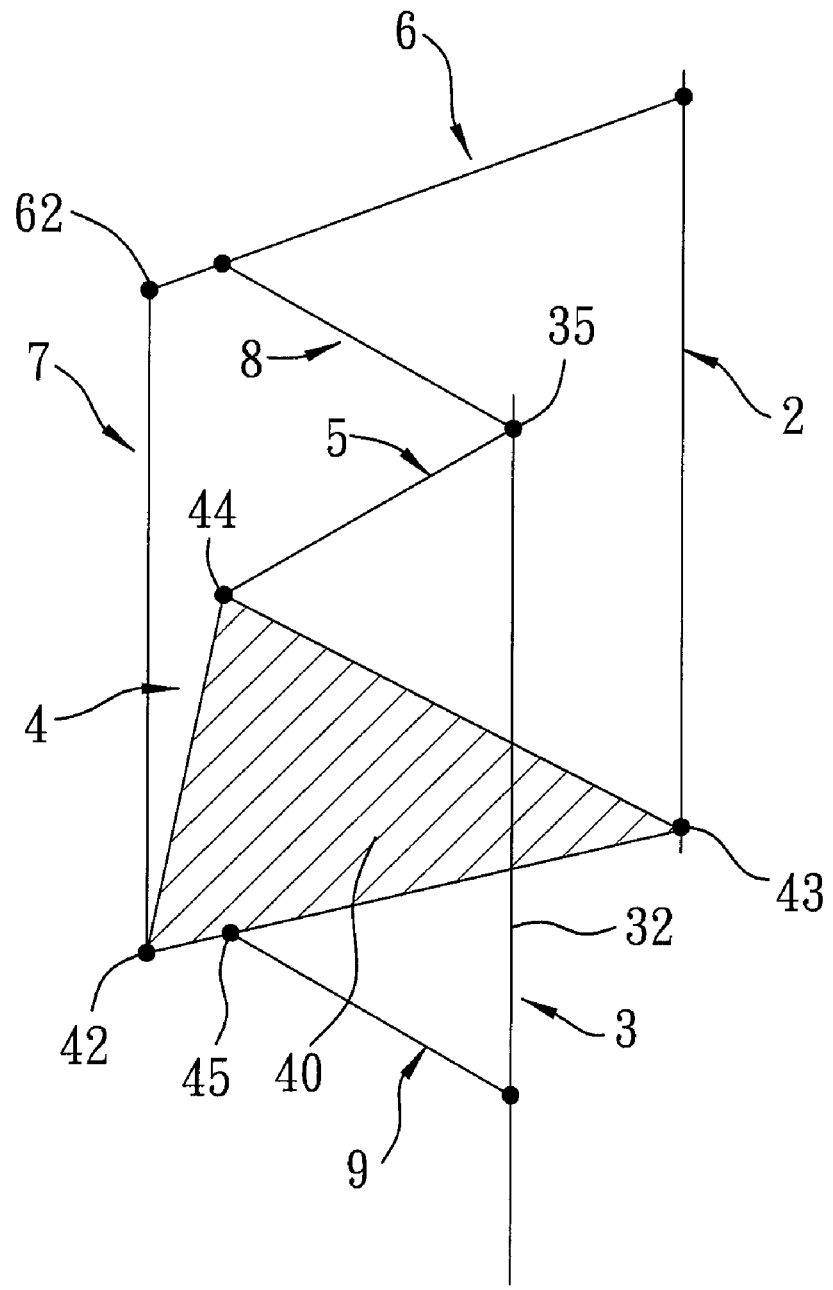
FIG. 8 is a schematic diagram of a third embodiment of a shock-absorbing suspension device according to this invention in a state of use.

Referring to FIG. 8, a third embodiment of a shock-absorbing suspension device according to this invention is shown to be similar to the first embodiment in construction, except that the force transmitting member 7 in this embodiment is configured to be coupled to the counteracting body 40 at a pivotal point 42 that is forward of the lower linked end 45 and that is in line with a straight line drawn between the lower linked end 45 and the pivoting axis 43. In addition, the connecting rod 8 is disposed to couple the upper segment 32 to the cantilever arm 6 at a position proximate to the front bearing end 62. It is noted that the pivotal point 42 at which the force transmitting member 7 is coupled to the counteracting body 40 may be disposed rearward of the lower linked end 45, rather than forward of the lower linked end 45, and the connecting rod 8 is coupled to the cantilever arm 6 at the position that is forward of the front bearing end 62.

Figure 9:
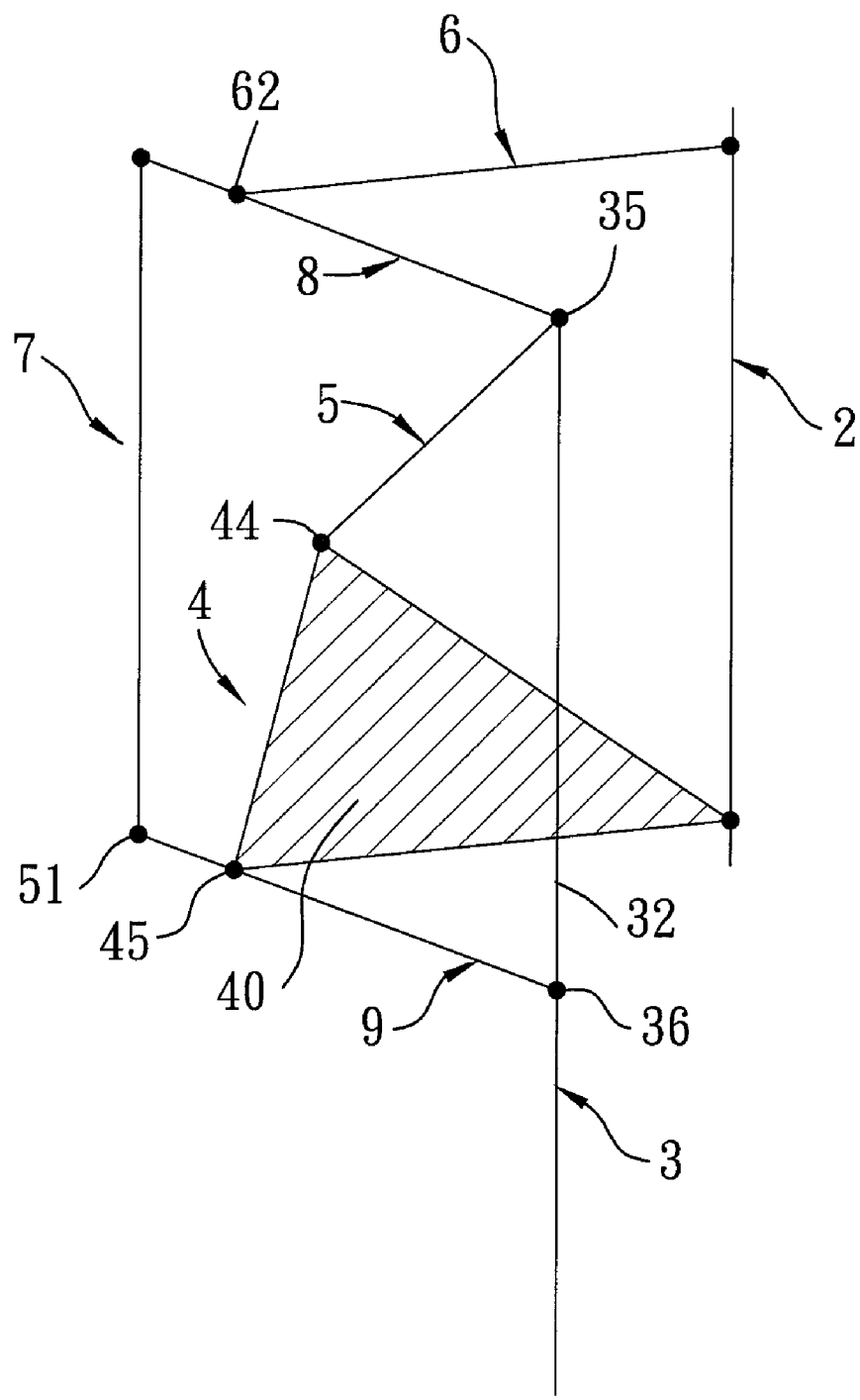
FIG. 9 is a schematic diagram of a fourth embodiment of a shock-absorbing suspension device according to this invention in a state of use.

Referring to FIG. 9, a fourth embodiment of a shock-absorbing suspension device according to this invention is shown to be similar to the first embodiment in construction, except that the force transmitting member 7 in this embodiment is configured to be coupled to the four-bar linkage mechanism at a position that is forward of the lower linked end 45, and that is in a lengthwise line of the lower linking bar 9. In particular, the lower linking bar 9 extends from the lower linked end 45 to terminate at a forward linked end 51 such that the force transmitting member 7 is linked to the forward linked end 51. In addition, the force transmitting member 7 is coupled to the connecting rod 8, rather than the cantilever arm 6. The front bearing end 62 of the cantilever arm 6 is pivotally mounted on the connecting rod 8, and is disposed rearward of the force transmitting member 7. Thus, while the force transmitting member 7 transmits the dampened shock force to the front bearing end 62, the connecting rod 8 generates an auxiliary counteracting force to urge the force transmitting member 7 against the upward or downward jerking movement. It is noted that the force transmitting member 7 may be disposed rearward of the lower linked end 45.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A shock-absorbing suspension device adapted to couple a frame of a wheeled vehicle with a wheel axle, comprising:
    a mounting rod which is adapted to be mounted on the frame, and which has upper and lower ends opposite to each other in an upright direction;
    a wheel rod having a lower segment which is adapted to be mounted on the wheel axle to transmit upwards from the wheel axle a shock force generated as a result of passing of the wheeled vehicle over an uneven road surface, and an upper segment which extends from said lower segment in the upright direction to terminate at a top end that is jerked upwards and downwards when the shock force is transmitted upwards, and which has proximate and distal regions relative to said top end, said upper segment being disposed forward of said mounting rod in a longitudinal direction transverse to the upright direction;
    a counteracting member including
        a pivoted region which is pivotally mounted on said lower end of said mounting rod about a pivoting axis in a transverse direction transverse to both the upright and longitudinal directions, and
        a counteracting body configured to extend from said pivoted region forward to terminate at a coupler area which extends in the upright direction to terminate at upper and lower linked ends;
    upper and lower linking bars, said upper linking bar being disposed to couple said upper linked end to said proximate region, said lower linking bar being disposed to couple said lower linked end to said distal region to thereby form a four-bar linkage mechanism such that, as a result of upward or downward jerking movement of said top end, said coupler area of said counteracting body is moved downwards or upwards about the pivoting axis, thereby dampening the shock force transmitted to said counteracting body;
    a cantilever arm disposed to extend from said upper end in the longitudinal direction to terminate at a bearing end; and
    a force transmitting member disposed to couple with said four-bar linkage mechanism so as to transmit the dampened shock force to said bearing end to thereby minimize impact of the shock force on said mounting rod;
    said upper and lower linking bars respectively defining upper and lower lengthwise lines which extend forward and which intersect at a vertex, said force transmitting member being coupled to said counteracting body at a pivotal point such that a pivotal axis passing through the pivotal point is oriented in a direction parallel to the pivoting axis, and such that the pivotal axis intersects a straight line drawn between the vertex and the pivoting axis substantially at a right angle.

2. The shock-absorbing suspension device according to claim 1, wherein, in terms of the four-bar linkage, a frame-side length measured along said upper segment is two times a coupler-side length measured along said coupler area.

3. The shock-absorbing suspension device according to claim 2, wherein said force transmitting member is configured to extend from said pivotal point downwardly to terminate at a lower coupled end, said shock-absorbing suspension device further comprising a connecting rod disposed to couple said distal region to said lower coupled end so as to generate an auxiliary counteracting force to urge said force transmitting member through said lower coupled end against the upward or downward jerking movement of said top end.

4. The shock-absorbing suspension device according to claim 1, further comprising a connecting rod configured to couple said upper segment to said force transmitting member so as to generate an auxiliary counteracting force to urge said force transmitting member against the upward or downward jerking movement of said top end.

5. The shock-absorbing suspension device according to claim 4, wherein said connecting rod is disposed to extend parallel to said straight line.

6. The shock-absorbing suspension device according to claim 5, wherein said connecting rod has a length which is the same as a distance between said pivotal point and said upper segment along the straight line.

7. The shock-absorbing suspension device according to claim 4, wherein said connecting rod is disposed between said cantilever arm and said upper linking bar in the upright direction.

8. The shock-absorbing suspension device according to claim 1, further comprising a spring-loaded shock-absorber disposed to couple said wheel rod to said pivoted region at a position that is rearward of said pivoting axis.

9. The shock-absorbing suspension device according to claim 1, wherein said force transmitting member is configured to couple said counteracting body to said bearing end.

10. A shock-absorbing suspension device adapted to couple a frame of a wheeled vehicle with a wheel axle, comprising:
    a mounting rod which is adapted to be mounted on the frame, and which has upper and lower ends opposite to each other in an upright direction;
    a wheel rod having a lower segment which is adapted to be mounted on the wheel axle to transmit upwards from the wheel axle a shock force generated as a result of passing of the wheeled vehicle over an uneven road surface, and an upper segment which extends from said lower segment in the upright direction to terminate at a top end that is jerked upwards and downwards when the shock force is transmitted upwards, and which has proximate and distal regions relative to said top end, said upper segment being disposed forward of said mounting rod in a longitudinal direction transverse to the upright direction;
    a counteracting member including
        a pivoted region which is pivotally mounted on said lower end of said mounting rod about a pivoting axis in a transverse direction transverse to both the upright and longitudinal directions, and
        a counteracting body configured to extend from said pivoted region forward to terminate at a coupler area which extends in the upright direction to terminate at upper and lower linked ends;

upper and lower linking bars, said upper linking bar being disposed to couple said upper linked end to said proximate region, said lower linking bar being disposed to couple said lower linked end to said distal region to thereby form a four-bar linkage mechanism such that, as a result of upward or downward jerking movement of said top end, said coupler area of said counteracting body is moved downwards or upwards about the pivoting axis, thereby dampening the shock force transmitted to said counteracting body;

a cantilever arm disposed to extend from said upper end in the longitudinal direction to terminate at a bearing end; and a force transmitting member disposed to couple with said four-bar linkage mechanism so as to transmit the dampened shock force to said bearing end to thereby minimize impact of the shock force on said mounting rod;

wherein said force transmitting member being configured to couple said four-bar linkage mechanism at a position that is forward of said lower linked end, and that is in line with a straight line drawn between said lower linked end and said pivoting axis, said shock-absorbing suspension device further comprising a connecting rod which is disposed to couple said upper segment to said cantilever arm at a position proximate to said bearing end so as to generate an auxiliary counteracting force to urge said force transmitting member against the upward or downward jerking movement of said top end.

11. A shock-absorbing suspension device adapted to couple a frame of a wheeled vehicle with a wheel axle, comprising:

a mounting rod which is adapted to be mounted on the frame, and which has upper and lower ends opposite to each other in an upright direction;

a wheel rod having a lower segment which is adapted to be mounted on the wheel axle to transmit upwards from the wheel axle a shock force generated as a result of passing of the wheeled vehicle over an uneven road surface, and an upper segment which extends from said lower segment in the upright direction to terminate at a top end that is jerked upwards and downwards when the shock force is transmitted upwards, and which has proximate and distal regions relative to said top end, said upper segment being disposed forward of said mounting rod in a longitudinal direction transverse to the upright direction;

a counteracting member including
  a pivoted region which is pivotally mounted on said lower end of said mounting rod about a pivoting axis in a transverse direction transverse to both the upright and longitudinal directions, and
  a counteracting body configured to extend from said pivoted region forward to terminate at a coupler area which extends in the upright direction to terminate at upper and lower linked ends;

upper and lower linking bars, said upper linking bar being disposed to couple said upper linked end to said proximate region, said lower linking bar being disposed to couple said lower linked end to said distal region to thereby form a four-bar linkage mechanism such that, as a result of upward or downward jerking movement of said top end, said coupler area of said counteracting body is moved downwards or upwards about the pivoting axis, thereby dampening the shock force transmitted to said counteracting body;

a cantilever arm disposed to extend from said upper end in the longitudinal direction to terminate at a bearing end; and a force transmitting member disposed to couple with said four-bar linkage mechanism so as to transmit the dampened shock force to said bearing end to thereby minimize impact of the shock force on said mounting rod;

wherein said force transmitting member being configured to couple said four-bar linkage mechanism at a position that is forward of said lower linked end, and that is in a lengthwise line of said lower linking bar, said shock-absorbing suspension device further comprising a connecting rod which is disposed to couple said proximate region to said force transmitting member, said bearing end being pivotally mounted on said connecting rod, and being disposed rearward of said force transmitting member such that, while said force transmitting member transmits the dampened shock force to said bearing end, said connecting rod generates an auxiliary counteracting force to urge said force transmitting member against the upward or downward jerking movement of said top end.

* * * * *